No. 859,660. PATENTED JULY 9, 1907.
E. J. HILL.
DOUBLE ENDED OR S-HOOK.
APPLICATION FILED DEC. 14, 1906.

2 SHEETS—SHEET 1.

WITNESSES:
W. M. Avery
J. O. Davis

INVENTOR
Edward Jacob Hill
BY
Munn & Co
ATTORNEYS

THE NORRIS PETERS CO., WASHINGTON, D. C.

No. 859,660. PATENTED JULY 9, 1907.
E. J. HILL.
DOUBLE ENDED OR S-HOOK.
APPLICATION FILED DEC. 14, 1906.
2 SHEETS—SHEET 2.
Fig. 3.
Fig. 4.
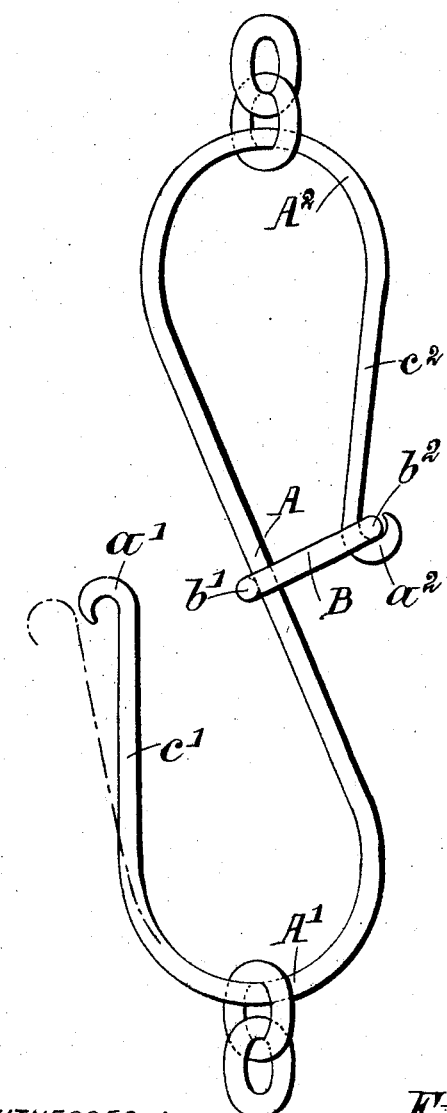
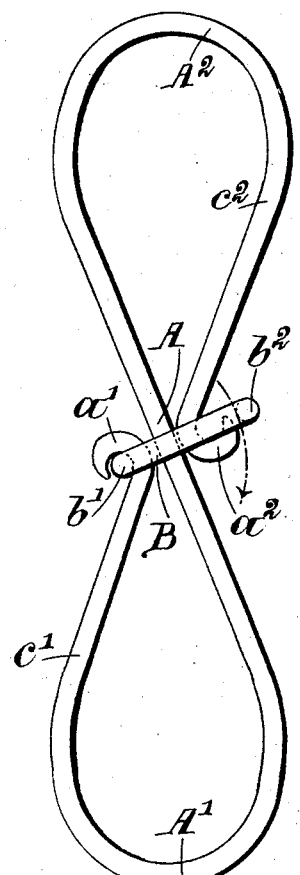
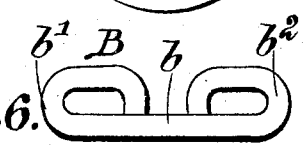
Fig. 6.
WITNESSES:
W. M. Avery
J. P. Davis
INVENTOR
Edward Jacob Hill
BY Munn & Co
ATTORNEYS

UNITED STATES PATENT OFFICE.

EDWARD JACOB HILL, OF WESTMINSTER, LONDON, ENGLAND.

DOUBLE-ENDED OR S-HOOK.

No. 859,660. Specification of Letters Patent. Patented July 9, 1907.

Application filed December 14, 1906. Serial No. 347,865.

*To all whom it may concern:*

Be it known that I, EDWARD JACOB HILL, a subject of the King of Great Britain, and a resident of 11 Victoria street, in the city of Westminster, London, England, engineer, have invented a certain new and useful Improvement in Double-Ended or S-Hooks, of which the following is a full, clear, and exact description.

My invention relates to an improved double-ended or S-hook, comprising the hook proper and a mousing link which is independent of and wholly separable from the hook and can therefore be disconnected from either or from both ends of the hook at will, yet without being necessarily detached from the hook as a whole, so that both loops of the hook (instead of only one as usual) may be opened to permit of their engagement with or disengagement from closed eyes, without the risk of the mousing link being accidentally lost. The hook of my invention is thus broadly distinguishable from other hooks of this character in which the link is permanently attached to the hook.

Figure 1:
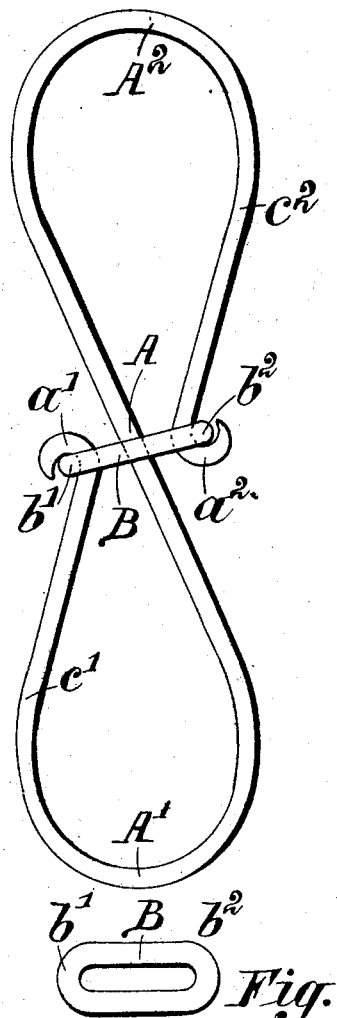
Figure 2:
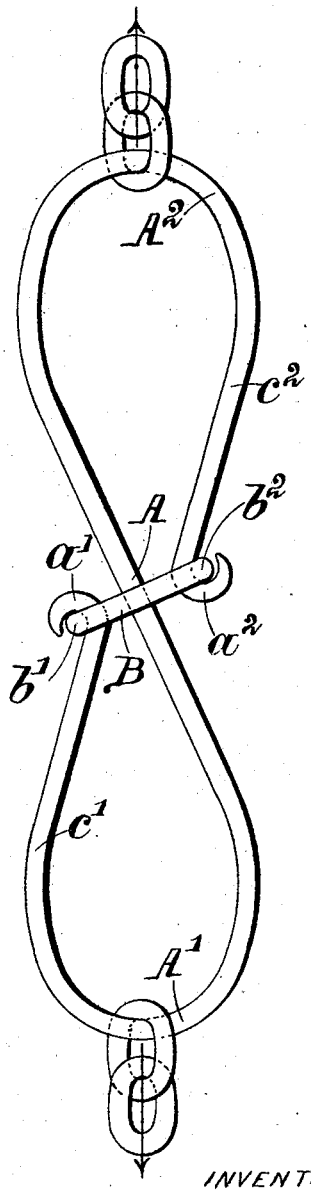

In the accompanying drawings Figure 1 shows the improved S-hook in what may be termed normal condition, that is to say, with both its loops closed by the mousing link but not under tensile stress, while Fig. 2 shows the hook similarly closed and under tensile stress. Fig. 3 also shows the hook under tensile stress, but with one of its loops open. Fig. 4 shows the hook with the mousing link engaged with one of the terminal hooks and in process of being engaged with or disengaged from the other terminal hook. Fig. 5 shows the preferred form of mousing link and Fig. 6 illustrates a modified form of the same.

Similar letters of reference indicate corresponding parts in all the figures.

The hook proper consists of a single length of rod or wire bent to a nearly closed S form or approximate figure-of-eight with its ends recurved to constitute short open terminal hooks $a^1$ $a^2$ lying in the same plane with the main loops $A^1$ $A^2$ and facing in directions opposite to one another. The mousing link B is preferably completely closed and of the oblong shape shown in Fig. 5, its side members crossing the waist A of the S-hook at the opposite faces of the latter, and the bows $b^1$ $b^2$ of the link being adapted to be engaged with the respective terminal hooks $a^1$ $a^2$ of the loops $A^1$ $A^2$.

The internal length of the link B (Fig. 5) is made such that in order to permit of both its bows $b^1$ $b^2$ being engaged with or disengaged from the hooks $a^1$ $a^2$, one or both of the outer or free limbs $c^1$ $c^2$ of the S-hook must be sprung slightly inwards towards the waist A as indicated in Fig. 4, the terminal hooks $a^1$ $a^2$ being preferably so placed that the link B when thus engaged with both will cross the waist A of the S-hook obliquely as indicated in Figs. 1 and 2. When the hook as a whole is thus closed by the link B, it may be subjected to any degree of tensile stress (see Fig. 2) without either of the loops $A^1$ $A^2$ opening as would be the case if the link B were disengaged from, say, one of the terminal hooks, as shown in Fig. 3 in the case of the terminal hook $a^1$.

The transverse breadth of each loop $A^1$ and $A^2$ of the S-hook is made greater than the internal length of the link B (Fig. 5) so that, when disengaged from either of the terminal hooks $a^1$ $a^2$ (see Fig. 3) or even from both of the latter, the link cannot become accidentally detached altogether from the S-hook; it being necessary, in order to effect complete detachment, that the link should be first disengaged from both hooks $a^1$ $a^2$ and then threaded over the entire length of the S-hook to the point of one of the terminal hooks $a^1$ or $a^2$.

It will be obvious that the link B may be of various forms. In Fig. 6 is shown a link which has only a single side member $b$, each of the end loops $b^1$ $b^2$ being separately closed and made of an internal length adapted to permit of its being passed over one of the terminal hooks $a^1$ $a^2$ of the S-hook.

It will be obvious that the improved S-hook is capable of being applied in a great variety of ways, and (among other uses) is specially adapted for building up chains of indefinite length, each link of such a chain being capable of ready disengagement from the adjacent link on either side.

What I claim as new and desire to secure by Letters Patent is:—

A hook, comprising an S-shaped hook of spring material and having the ends of its free limbs bent outwardly and approximately parallel with the said limbs to form terminal hooks facing in opposite directions, and a mousing link upon the hook and adapted to close the loops of the S-hook.

EDWARD JACOB HILL.

Witnesses:
  H. D. JAMESON,
  F. L. RAND.